(12) United States Patent  
Su

(10) Patent No.: US 11,004,355 B2
(45) Date of Patent: May 11, 2021

(54) INTELLIGENT WEARABLE DEVICE, AND WORKING ASSISTANCE METHOD AND SYSTEM BASED THEREON

(71) Applicant: SHENZHEN AUGMENTED REALITY TECHNOLOGIES CO., LTD., Guangdong (CN)

(72) Inventor: Bo Su, Shenzhen (CN)

(73) Assignee: SHENZHEN AUGMENTED REALITY TECHNOLOGIES CO., LTD., Guangdong (CN)

( * ) Notice: Subject to any disclaimer, the term of this patent is extended or adjusted under 35 U.S.C. 154(b) by 228 days.

(21) Appl. No.: 16/346,575

(22) PCT Filed: Aug. 11, 2016

(86) PCT No.: PCT/CN2016/094691
§ 371 (c)(1),
(2) Date: May 1, 2019

(87) PCT Pub. No.: WO2017/161798
PCT Pub. Date: Sep. 28, 2017

(65) Prior Publication Data
US 2019/0355275 A1    Nov. 21, 2019

(30) Foreign Application Priority Data

Mar. 25, 2016 (CN) .......................... 201610176643.0
Mar. 25, 2016 (CN) .......................... 201610176840.2
Mar. 25, 2016 (CN) .......................... 201610179292.9
Mar. 25, 2016 (CN) .......................... 201620238744.1

(51) Int. Cl.
| G09B 19/00 | (2006.01) |
| G02B 27/01 | (2006.01) |
| G06F 3/01 | (2006.01) |
| G06Q 10/06 | (2012.01) |
| G08B 21/18 | (2006.01) |

(52) U.S. Cl.
CPC ....... *G09B 19/003* (2013.01); *G02B 27/0172* (2013.01); *G06F 3/011* (2013.01); *G06Q 10/06398* (2013.01); *G08B 21/18* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

2006/0287783 A1 * 12/2006 Walker .................... H04Q 9/00
701/31.4
2014/0200941 A1 * 7/2014 McDaniel ...... G06Q 10/063116
705/7.16

(Continued)

*Primary Examiner* — Jeffrey J Chow
(74) *Attorney, Agent, or Firm* — Westbridge IP LLC

(57) ABSTRACT

An intelligent wearable device, and a work assistance method and system based thereon. The intelligent wearable device comprises: a control unit (11) for controlling the intelligent wearable device; a display unit (12) for displaying information for assisting working; a storage unit (13) for storing various pieces of data information during a working process; and a positioning and tracking unit (14) for respectively positioning and tracking an operator and an operation object, and notifying the operator of the positioned and tracked information.

16 Claims, 4 Drawing Sheets

(56) References Cited

U.S. PATENT DOCUMENTS

| | | | | |
|---|---|---|---|---|
| 2014/0354529 | A1* | 12/2014 | Laughlin | G06F 3/011 |
| | | | | 345/156 |
| 2015/0302650 | A1* | 10/2015 | Abdelmoati | G06F 3/0488 |
| | | | | 345/633 |
| 2015/0339453 | A1* | 11/2015 | Richards | G06T 19/006 |
| | | | | 345/633 |
| 2017/0092220 | A1* | 3/2017 | Mullins | G06F 3/011 |
| 2017/0131711 | A1* | 5/2017 | Thomson | G07C 5/0808 |
| 2017/0351921 | A1* | 12/2017 | Tanaka | G06F 3/011 |

* cited by examiner

INTELLIGENT WEARABLE DEVICE, AND WORKING ASSISTANCE METHOD AND SYSTEM BASED THEREON

BACKGROUND OF THE INVENTION

1. Field of the Invention

The present invention relates to the field of intelligent wearable technologies, and in particular, to an intelligent wearable device, and a work assistance method and system based on the intelligent wearable device.

2. Description of Related Art

With continuous advancement of science and technologies, humans are about to enter the era of Industry 4.0. In this era, more emphasis is placed on intelligent production, and human-computer interaction is an important component for achieving intelligent production.

In the field such as industrial manufacturing, people are having increasingly high requirements for products. Products are required to be more intelligent and easier to operate. However, to meet these requirements, product manufacturing becomes more and more complicated. In many fields of product manufacturing, robots still cannot replace operators. However, the operators are facing increasingly complex industrial manufacturing environments, and not only higher requirements on operational safety for the operators are imposed, but also requirements in terms of professional skills, work literacy, and work efficiency of the operators are increasingly demanding.

In recent years, new technologies have emerged, such as a virtual reality (VR) technology, an augmented reality (AR) technology, and an intelligent wearable technology. Currently, there are applications on the market that combine the intelligent wearable technology with the AR technology or the VR technology, for example, products such as Oculus Rift, Microsoft's HoloLens, and Google's Google Glass. These products mainly focus on individual consumers, and provide life entertainment experience for the individual consumers.

In industrial manufacturing, appalling safety accidents often break out, leading to huge economic losses and causing casualties. These safety accidents are related to staff member's irregular operations and negligence.

In addition, in the patent application document with the publication No. CN104484523A, a device and a method for realizing an augmented reality induction maintenance system are mainly disclosed. Hardware includes a pair of 3D smart glasses, a helmet, and an optical position tracker. Steps of a method for realizing the augmented reality induction maintenance system are as follows: Step 1: Establish a virtual assembly model in a software system. Step 2: Complete position registration of the helmet worn by an operator. Step 3: Define a disassembly and assembly relationship level of components. Step 4: Track a position of the operator through the optical position tracker, to complete perception of a maintenance disassembly and assembly situation. Step 5: Generate disassembly and assembly induction information. Step 6: Superimpose and display the induction information. Although also shown in the foregoing patent application document, whether the operation of the operator conforms to requirements is not determined. Consequently, work quality cannot be determined, and even the entire work is in vain because some steps are inaccurately performed. This does not provide effective work assistance and is time and labor-consuming, resulting in waste of materials and increasing work costs.

Therefore, how to apply an intelligent wearable device to people's work, to provide assistance for work, and improve operation safety, work efficiency, and the like has become a technical problem to be urgently resolved in the industry currently.

SUMMARY OF THE INVENTION

Technical Problem

A technical problem to be resolved by the present invention is to provide an intelligent wearable device, and a work assistance system and method based on the intelligent wearable device, to resolve a prior-art problem of poor work assistance effect, non-ensured work quality, time and labor-consuming work, low work efficiency, and high costs.

Solutions to the Problem

Technical Solutions

To resolve the foregoing problem, the technical solutions of the present invention are an intelligent wearable device, and a work assistance system and method based on the intelligent wearable device, to resolve the prior-art problem of poor work assistance effect, non-ensured work quality, time and labor-consuming work, low work efficiency, and high costs.

The present invention provides an intelligent wearable device, where the intelligent wearable device is applied to work assistance, and includes: a control unit, configured to control the intelligent wearable device; a display unit, configured to display assistance work information; and a storage unit, configured to store various pieces of data information during a working process; and a positioning and tracking unit for respectively positioning and tracking an operator and an operation object, and notifying the operator of the positioned and tracked information.

The present invention further provides a work assistance method based on the intelligent wearable device according to any one of the foregoing items, including: S1: the intelligent wearable device displaying a current operation step of a to-be-operated object; S2: determining whether an operation of the operator meets a requirement of the current operation step; and S3: if yes, displaying a next operation step of the to-be-operated object.

The present invention further provides a work assistance system based on the intelligent wearable device according to any one of the foregoing items, including: an operation step display unit, disposed in the intelligent wearable device, and configured to display a current operation step of a to-be-operated object; an operation step judging unit, configured to determine whether an operation of the operator meets a requirement of the current operation step; and an operation step control unit, configured to: when the operation of the operator meets the requirement of the current operation step, control the display unit to display the next operation step of the to-be-operated object.

The present invention further provides a work assistance system based on an intelligent wearable device, including: an intelligent wearable device and a server, the server exchanges work assistance-related information with the intelligent wearable device, the intelligent wearable device includes a processor, a memory, and a display, the processor is connected to the memory and the display, the memory stores a set of program code, and the processor is configured to invoke the program code stored in the memory, to perform the following operations:

displaying, on the display, a current operation step of a to-be-operated object;

determining whether an operation of an operator meets a requirement of the current operation step; and when the operation of the operator meets the requirement of the current operation step, controlling the display to display a next operation step of the to-be-operated object.

Beneficial Effects of the Invention

Beneficial Effects

The intelligent wearable device and the work assistance method and system based thereon in the present invention have favorable work assistance effects, and work quality is effectively ensured. In addition, work becomes simple, work efficiency is improved, and costs are low.

BRIEF DESCRIPTION OF THE DRAWINGS

Description of the Drawings

Figure 1:
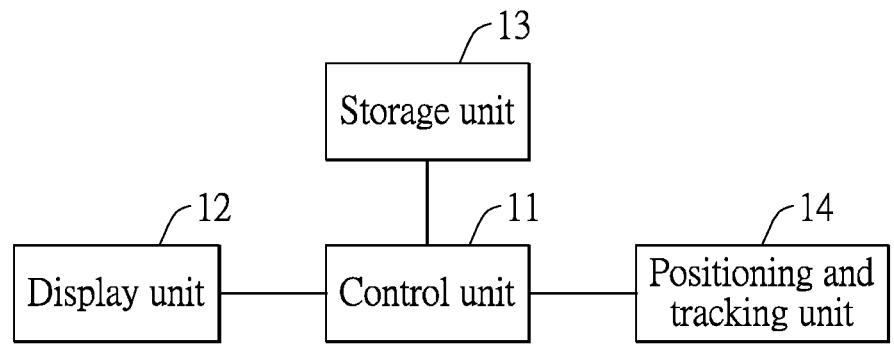
Figure 2:
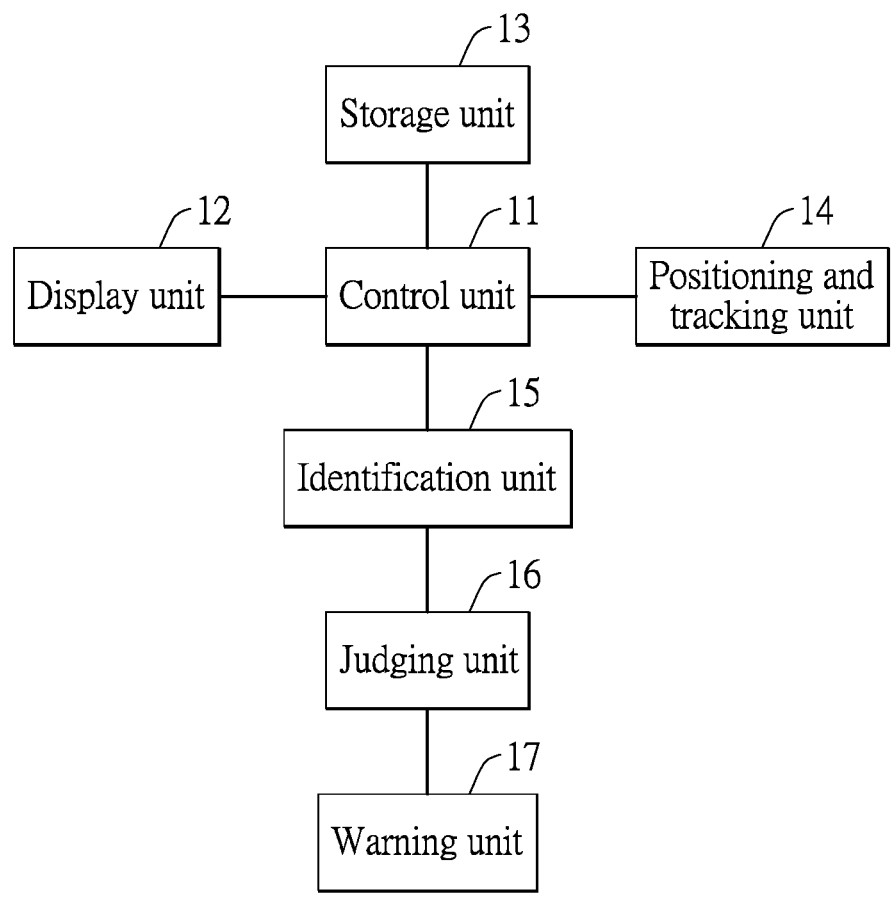
Figure 3:
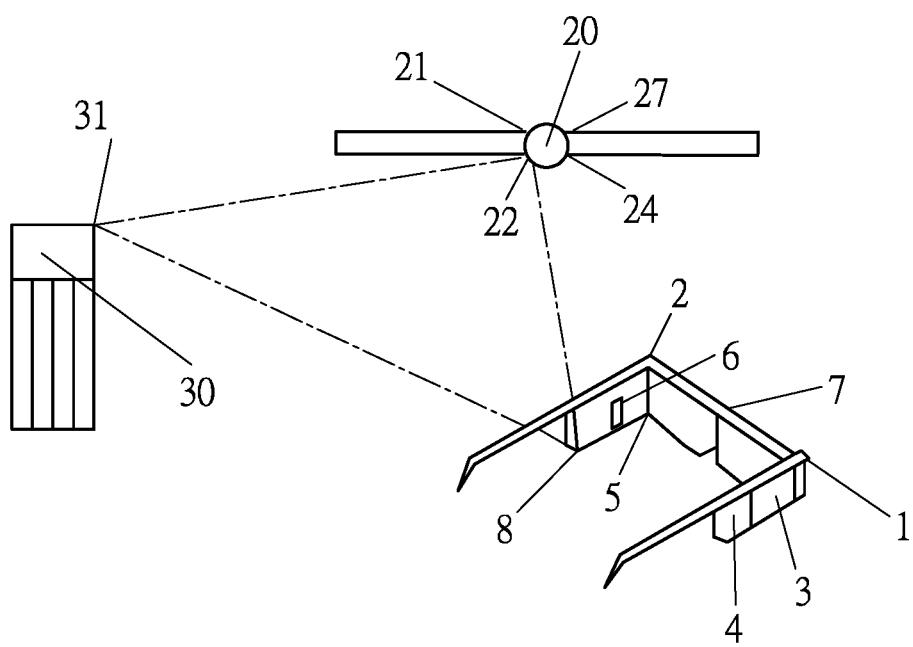
Figure 4:
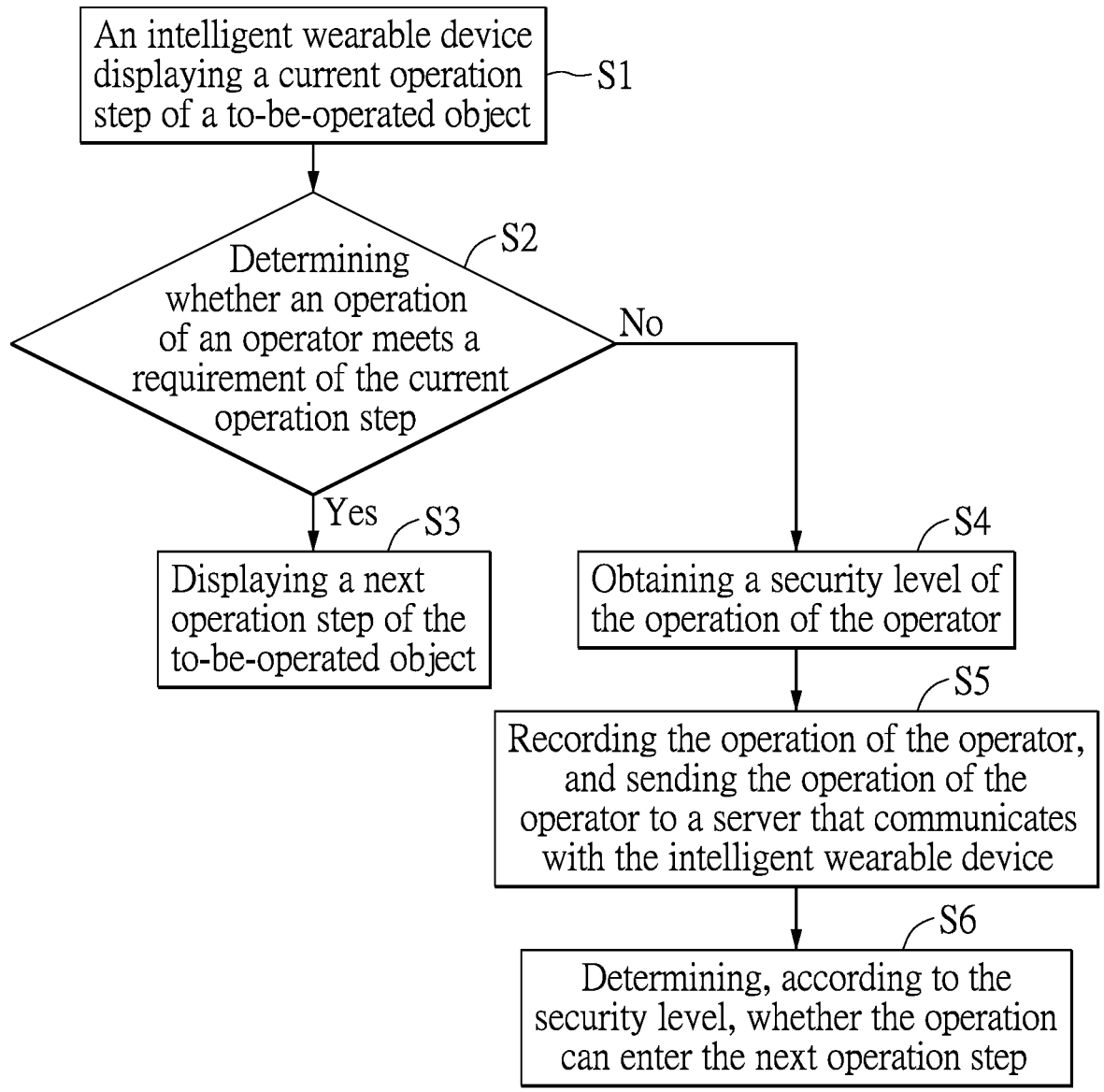
Figure 5:
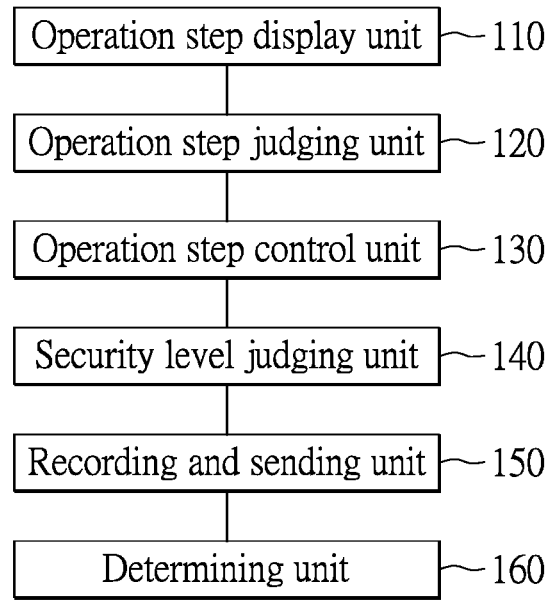
Figure 6:
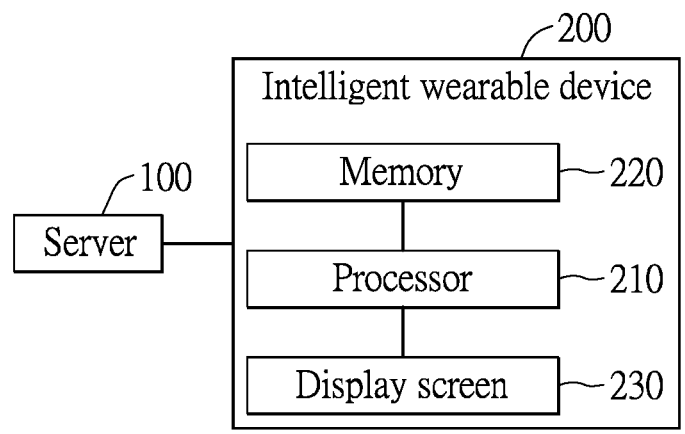

FIG. 1 is a schematic structural diagram of an intelligent wearable device according to a preferred implementation of the present invention;

FIG. 2 is a schematic structural diagram of an intelligent wearable device according to another preferred implementation of the present invention;

FIG. 3 is a schematic structural diagram of an intelligent wearable system with an intelligent head-mounted device according to a preferred embodiment of the present invention;

FIG. 4 is a schematic flowchart of a work assistance method based on an intelligent wearable device according to still another preferred implementation of the present invention;

FIG. 5 is a schematic structural diagram of a work assistance system based on an intelligent wearable device according to yet another preferred implementation of the present invention; and FIG. 6 is a schematic structural diagram of a work assistance system based on an intelligent wearable device according to yet another preferred implementation of the present invention.

DETAILED DESCRIPTION OF THE PREFERRED EMBODIMENTS

Embodiments of the Invention

Implementations of the Present Invention

The following describes the present invention in detail with reference to accompanying drawings and embodiments. It should be noted that, if not conflicting, the embodiments of the present invention and various features in the embodiments may be combined with each other, and are all within the protection scope of the present invention.

Referring to FIG. 1 and FIG. 2, FIG. 1 is a schematic structural diagram of an intelligent wearable device according to a preferred implementation of the present invention, and FIG. 2 is a schematic structural diagram of an intelligent wearable device according to another preferred implementation of the present invention. As shown in FIG. 1 and FIG. 2, in the preferred implementations of the present invention, that the intelligent wearable device is an intelligent head-mounted device is used as an example to describe a circuit structure of the intelligent wearable device. Certainly, the intelligent wearable device is not limited to an intelligent head-mounted device, but may be another intelligent wearable device. A common intelligent head-mounted device includes smart glasses, an intelligent hamlet, or other devices. The intelligent head-mounted device is applied to work assistance. Herein, the intelligent head-mounted device includes:

a control unit 11, configured to control the intelligent head-mounted device;

a display unit 12, configured to display assistance work information;

a storage unit 13, configured to store various pieces of data information during a working process; and a positioning and tracking unit 14, configured to position and track an operator and an operation object separately, and notify the operator of the positioned and tracked information. The operation object is an entity object being operated by the operator, for example, may be a valve pump being replaced by the operator, or an electronic device being repaired by the operator. The display unit 12 is a translucent display, a transparent display, or an opaque display.

The assistance work information is operation information of a specific working task performed on the operation object and an operation procedure. The data information includes: a time for the operator to complete a preset step, a quantity of times for repeatedly playing the preset step and a time for completing the preset step, work quality of the operator for completing the preset step, a time for the operator to complete the entire operation procedure, all operation postures of the operator for completing the entire operation procedure, a quantity of times for sending alarms of misoperations of the operator, a video of the operator completing the entire operation procedure, and a video of an alarm for the operator.

Further, the control unit 11 is further configured to control the operation object. Specifically, an APP may be installed in the intelligent head-mounted device to control the operation object. For example, the APP in the intelligent head-mounted device may be used to control opening and closing of an intelligent curtain.

The intelligent head-mounted device further includes: an identification unit 15, configured to identify an action of the operator and feature information of the operation object; and a determining unit 16, configured to determine whether the action of the operator meets a preset requirement, and whether the feature information of the operation object matches preset feature information.

The feature information includes at least one type of the following information: position and posture information of the operation object, temperature information of the operation object, and pressure information of the operation object. Alternatively, the feature information may be an attribute that can be used to identify the operation object, for example, a name, a shape, a size, or other information of the operation object.

The intelligent head-mounted device further includes: a warning unit 17, configured to send alarm information when a determining result of the determining unit is no. The alarm information may be used to send an alarm to the operator in a form of text, voice, or image.

The intelligent head-mounted device further includes: a first environment sensing unit 18, configured to sense first information of a working environment of the operator. The first information is working environment information, and for example, may be pressure and temperature information of an oil pipeline, or information about radiation intensity around a nuclear reactor.

The intelligent head-mounted device further includes: a power supply, configured to provide a working power supply for the intelligent head-mounted device; and a lighting device, configured to provide lighting for the intelligent head-mounted device in the working environment.

The intelligent head-mounted device further includes: a head-mounted device communications unit 19, configured to establish a communication connection to an assistance work-related device. The assistance work-related device may be at least one of a smart band, a smart anklet, a smart neck ring, a smart headband, smart clothes, smart gloves, smart shoes, a smart finger ring, smart braces, or a smart armband.

The intelligent head-mounted device further includes: a voice input and output device 20, configured to input and output audio information.

The intelligent head-mounted device is smart glasses or a smart hamlet.

The intelligent head-mounted device provided by this embodiment of the invention can automatically identify and display a specific work task, an operation procedure, and operation information of the operation object, instruct the operator to correctly perform operations, and can record various types of data information during the operation process, and standardize operation steps and procedures. The operator and the operation object are positioned and tracked, so that whether the operation is standardized is determined in real time, and an alarm is sent in a timely manner, to avoid a violation operation, avoid operation step missing or operation disorder when the operator works, and ensures operation safety, thereby greatly reducing hidden dangers caused by human behavior. In addition, work efficiency of the operator is improved while good professional habits of the operator are cultivated. Therefore, a problem of delayed overall working time resulting from incompetence of the operator in some operation steps is resolved, improving overall working capabilities and accomplishment of staff members. In addition, pre-employment training time and capital investment of an enterprise for an operator are greatly reduced.

FIG. 3 is a schematic structural diagram of an intelligent wearable system with an intelligent head-mounted device according to a preferred embodiment of the present invention. The intelligent wearable device and an intelligent motion sensing control device constitute an intelligent wearable system, the intelligent motion sensing control device sends, according to an received action instruction of the operator, a control instruction to control the intelligent wearable device to work, and the intelligent motion sensing control device is at least one of a smart band, a smart anklet, a smart neck ring, a smart headband, smart clothes, smart gloves, smart shoes, a smart finger ring, smart braces, or a smart armband.

As shown in FIG. 3, the intelligent wearable system includes smart glasses (intelligent wearable device) and a smart band (intelligent motion sensing control device). The smart glasses includes: a translucent display/transparent display 1 disposed at positions of lenses, a voice input/output device 2 disposed at a side of the glasses frames, a camera 3, a wireless/wired communications device 4, a micro lighting flashlight 5, a high-capacity battery 6, a positioning tracker 7, and a built-in processor 8 (micro-computer). The smart band includes: a battery 20, configured to provide a working power supply; a vibration motor 21, configured to remind the operator; an action sensing accelerometer 22, configured to identify an action of the operator; a change key 24, configured to change the action to a customized action and establish a control instruction corresponding to the customized action; and an interface 27, configured to be connected to another electronic device. In addition, the foregoing intelligent wearable system is further provided with a background server. The background server includes: a server body 30 and an internal processor 31. The processor 31 is configured to process various types of information sent by the smart glasses and the smart band, to implement convenient work assistance.

In an example, the foregoing intelligent motion sensing control device includes: a motion sensing action identification unit, configured to identify motion sensing action information of the operator; a processing unit, configured to receive the motion sensing action information, and generate corresponding control information; and a motion sensing communications unit, configured to send the control information to the intelligent head-mounted device, and receive interaction information of the intelligent head-mounted device.

Further, the intelligent motion sensing control device further includes: a motion sensing sensor, configured to detect various types of work-related vital sign information of the operator. The vital sign information includes body temperature, fatigue state, blood pressure, pulse rate, heart rate, and other information. The operation state of the operator can be determined according to the vital sign information.

The intelligent motion sensing control device further includes: a health determining unit, configured to comprehensively determine whether the operator is suitable for work according to the various types of vital sign information.

The intelligent motion sensing control device further includes: an alarm unit, configured to send alarm information when the operator is not suitable for work. The alarm information is sent to the operator and a related person, so that they can know the situation in a timely manner and take treatment measures.

The intelligent wearable system further includes: a second environment sensor, configured to sense second information of the working environment of the operator. The second information is a sensor that is difficult to detect by the head-mounted device, or that is unsuitable for being disposed on the head-mounted device, such as an instrument specializing in detecting one or some environmental indicators.

The intelligent wearable system further includes: an operation object information obtaining apparatus, configured to obtain work-related information of the operation object.

A wireless connection device is built in the smart glasses and is connected to the background server. All content (such as an operation step, video information, and image information) of the background server may be sent to a control unit of the smart glasses at any time according to a requirement. In addition, the smart glasses feeds back collected data information to the control unit built in the smart glasses, and transmits the data to the background server. The background server processes the data, and then may feedback the processed data to the smart glasses. Alternatively, the background server may store each piece of data information transmitted by the smart glasses for calculation and analysis, and then automatically determine work efficiency and working time of the operator, or the data information becomes big data for enterprises.

The data information collected by the smart glasses includes: a time for the operator to complete a preset step, a quantity of times for repeatedly playing the preset step and a time for completing the preset step, work quality of the operator for completing the preset step, a time for the operator to complete the entire operation procedure, all operation postures of the operator for completing the entire operation procedure, a quantity of times for sending alarms of misoperations of the operator, a video of the operator completing the entire operation procedure, and a video of an alarm for the operator.

The smart glasses may collect data in the following manners:

1. A start of each small step to completion of the small step is used as a time node, and a control unit of the smart glasses records, according to the step node, a time used by the operator to complete each small step during an operation task.

2. When the operator repeatedly watches instruction demonstration of a small step in the smart glasses, the control unit of the smart glasses records a quantity of times for repeating the step, and a time of completing the step after watching for a plurality of times.

3. For work quality of completing the step by the operator, an image is mainly obtained through motion sensing identification of a camera, and a gesture of the operator and an operation object are analyzed and identified through an identification unit and are compared with a three-dimensional model established in the storage unit, to determine whether the gesture of the operator and the operation object are consistent with or overlap with the three-dimensional model, so as to determine whether an action of the operator is standard, and whether a used operation tool is correct.

4. The control unit records the time for completing the entire work task by the operator.

5. An entire operation posture of the operator in the entire operation process is recorded as Big Data of a background server, to prepare for a latter standard posture, image data are processed, compared, and classified based on a deep neural network algorithm, and the neural network algorithm may identify texture and pattern information of an image. The algorithm may achieve an increasingly high identification accuracy rate under manual assistance training. When the identification accuracy rate is close to that of humans, labor costs can be greatly reduced.

6. During the entire operation process, after each time of misoperation of the operator is identified, a quantity of times of generating alarms by the control unit is recorded by the control unit.

7. An operation video of the operator during the entire operation process is recorded in the whole process and stored in the background server, a video progress bar is automatically generated, and a key node is marked.

8. A step performed by the operator in which an alarm appears during the operation process is particularly recorded and stored in the background server, and alarms of all operators at a step is recorded at any time.

After collecting data, the smart glasses may perform data analysis in the following manner:

1. The background server performs mathematical operations such as an average value operation, a variance operation, a normal distribution operation, a highest value operation, and a lowest value operation on recorded completion time of small steps of the operators, to obtain average time data, slowest time data, and fastest time data of completion of each small step by all the operators.

2. The background server performs grading on the small steps according to an operation difficulty degree. For example, the difficulty degree may be divided into easy (where the first grade is of a coefficient 0.8), general (where the second grade is of a coefficient 1.0), and hard (where the third grade is of a coefficient 1.2).

3. The background server compares the average time data, the slowest time data, and the fastest time data obtained in step 1 with a time of completing a small step by an operator and performs grading on the time, and a grading principle may be: The time taken by the operator being close to the slowest time of all the operators is 60 points, the time taken by the operator being close to the average time of all the operators is 80 points, and the time taken by the operator being close to the fastest time is 100 points.

4. The background server gives a score for completion of a small step by an operator according to a difficulty degree of completing the step by the operator and a time for completing the step. For example, an operator completes an easy step (belonging to the first grade with the coefficient 0.8) and the completion time is close to the average time (the time is 80 points). In this case, work efficiency of the operator is the first-grade coefficient of 0.8 being multiplied by the average time of 80 to get 64, and this value is work efficiency of an operator to complete a small step.

5. The background server performs addition operation processing on work efficiency of each small step of the operator to obtain work efficiency of completing the entire operation process.

6. The background server compares a quantity of repetition times for watching each step by the operator with a quantity of average times for watching the step by other operators to determine whether the operator is skilled in the work and gives a score (such as 60 points, 80 points, or 100 points). A comparison method is the same as the comparison method of work efficiency, and is not described again.

7. A motion sensing identification technology is used to identify whether an action and a posture of the operator during working are standard. For example, image data may be used to perform processing, comparison, and classification on the background server based on the deep neural network algorithm, and the deep neural network algorithm can identify texture and pattern information of an image, to identify whether the action and the posture of the operator during working are standard, whether use of tool by the operator is performed in accordance with a criterion, and so on, so as to preliminarily determine work quality of the operator and perform scoring. For example, the smart glasses feeds back the identified posture and action to the server, if the server determines that the action deviates far away from a standard three-dimensional model posture stored in the server through analyzing and calculation, the score is of 60 points, if the action is close to the standard posture, the score is of 80 points, and if the action almost overlaps with the standard posture, the score is of 100 points.

8. The background server records a same step that is frequently viewed by all the operators, and it indicates that the step is indeed complex and it is difficult to operate the step. The background server compares a time, taken to complete the operation, after the operator watches the step, and an average time for completing the operation step by all the operators, if the time is far higher than the average time, the score is of 60 points, if the time is almost the same as the average time, the score is of 80 points, and if the time is far lower than the average time, the score is of 100 points. A learning ability of an operator is determined according to a score of the operator. For calculation of the average time, refer to that in step 1.

9. The background server records a step whose watching frequencies by all staffs are the most and whose completion time is the longest, the step is a step of focus training that should be performed by an enterprise for a staff, and is further a basis indicating that the operation step needs to be optimized.

10. The background server tracks a device running effect at any time after the operator completes working as a supplementary determining of work quality of the operator. Specifically, the device running effect after the operator completes working may be reflected by using an electronic recorder.

11. The background server of the smart glasses performs mathematical calculation methods such as average value, maximum value, minimum value, and normal distribution on all data obtained each time the operator completes working, helps create personal monthly, quarterly, and annual reports of the operator, and obtains a work change curve of the operator by comparison of changes in work efficiency and work quality every day, every month, and every year, influencing performance, promotion, and demotion of the operator.

12. The background server automatically generates monthly, quarterly, and annual worksheets of all operators of the enterprise according to a large amount of data collected by the smart glasses, obtains a quality and capability change curve of overall staff members of the enterprise, and then obtains a personal average work quality change diagram of the enterprise.

13. The background server automatically forms a personal capability radar map for the operator according to collected personal work data of the operator, recording shortcomings of an operation technology of the operator, and next time when the operator performs an operation, the background server will remind, through the smart glasses in the step, the operator to be more careful about the shortcomings of the operator.

14. The working process of the operator is recorded and directly transmitted to an administration section through the background server, and the administration section can directly monitor and manage a status of a work site of the operator.

The intelligent head-mounted device in this embodiment of the present invention may be combined with an augmented reality technology, to be applied to wider fields.

The smart glasses are used as an example. The AR (augmented reality) technology is applied to operation steps of the smart glasses of the present invention. For some complicated operation processes, the AR technology may be used to instruct the operator to perform operations. In this way, the operator can complete operation work step by step according to instructions in an animation, thereby improving operation precision of the operator, and reducing operations that cannot be performed by the operator due to incompetence of the operator in the operation in the work field or operations that are blindly performed by the operator.

For example, when an engine on an automobile needs to be replaced, there may be hundreds of devices and screws connected to the engine. In addition, different tools need to be used for disassembling and assembling the screws and devices, or even screw directions are different, and various equipments and devices connected to the engine are disassembled and assembled in different orders. The augmented reality smart glasses of the present invention can be used to quickly and accurately disassemble and assemble the engine.

Specifically, when a user wears the smart glasses of the present invention to observe an engine component, the engine component may be considered as an operation object. A 3D stereo color image can be seen covering the real component through lenses of the smart glasses. When a component needs to be disassembled and assembled or screwed, the component will be highlighted in a field of vision. Subsequently, the display unit in the smart glasses shows that a corresponding 3D tool (such as a wrench or a caliper) is screwing a component clockwise, or shows that a 3D hand model is moving a virtual component superimposed on the real component, and there is an animation demonstrating a process of moving the component. The display unit of the smart glasses may display correct disassembly and assembly steps, actions, postures, and tool information (that is, feature information of the operation object), interact with the user by using a voice identification function, and instruct, through text, voice, and animation instructions, the user to complete the entire process of replacing the component step by step. In a maintenance process, all steps can be accessed at any time for re-viewing.

The intelligent head-mounted device in this embodiment of the present invention may be combined with a virtual technology, to be applied to wider fields.

The smart glasses are used as an example. Through the combination of the smart glasses and the virtual technology, an operation training process for an operator can be completed. By virtue of the virtual technology, a 3D stereo operation object identical to the operation object can be completely presented in front of the operator. The operator may freely move and transform the 3D operation object through gesture interaction, and may further completely disassemble a plurality of components in the 3D operation object from the operation object for display. The operator may observe at 360° or simulate the operation of all disassembled components, so that the operator can thoroughly understand all structures of the operation object and connection relationships between its components. The operator can quickly grasp disassembly and assembly skills of the operation object, and learning impression is deepened, thereby greatly improving learning interest of the operator, shortening learning time of the operator, and improving learning efficiency of the operator. In addition, the 3D operation object may alternatively be presented when the operator disassembles some component, so that the operator can comprehensively understand the structure of the component, improving its disassembly and assembly accuracy.

For example, in the field of teaching, a medical student who uses corpses first has high costs and cannot learn repeatedly, and cannot experience in depth in practice by watching videos or text words alone, leading to low learning efficiency. Through the smart glasses of the present invention, medical students can learn structures of various parts of human body and internal composition relationships between the parts, and can realize active operation of various parts of the human body.

Specifically, through combination of smart glasses and VR, a learner can wear the smart glasses and see a 3-D 1:1 stereo complete human image floating in front of the learner. Through gesture interaction, the learner can freely separate some part of the human body. For example, the learner can directly take the heart from the human body image by hand, hold it in the hand, and view an image of the heart at 360°. The learner can observe connection relationships between veins and arteries of the heart, and even can see vascular connection on the surface of the heart. Meanwhile, there are text introduction and voice introduction. Such a lively learning classroom not only deeply attracts students' interest in learning, but also enables the students to personally observe almost the same physical structure as the real one.

For another example, a doctor cannot observe a heart of a patient in an all-round way at 360 degrees in a process of heart surgery. To enable the doctor to concentrate on the operation, smart glasses worn by the doctor can show the doctor a 3D virtual heart that is exactly the same as a real heart with 360 degrees in all directions. The doctor can observe a structure and composition of the heart at any time. This will bring great changes to work efficiency of doctors.

The intelligent head-mounted device in this embodiment of the present invention may be combined with a camera motion sensing identification technology, to be applied to wider fields. The camera motion sensing identification technology is implemented by using the intelligent device motion sensing control device in Embodiment 2. The motion sensing action identification unit can identify both motion sensing action information of the operator and an operation posture of the operator.

The smart glasses are used as an example. The operation posture of the operator may be identified by using the motion sensing action identification unit in the intelligent device motion sensing control device. The processing unit identifies the operation posture of the operator, and determines whether the operation of the operator is standardized and qualified. The alarm unit sends an alarm of an incorrect operation action or posture of the operator to the operator for warning. This greatly reduces hidden dangers caused by the operator's own operation, standardizes operation actions, improves work efficiency, and most importantly, ensures operation safety.

An operation posture image of the operator is processed by the server. Operation posture image data is processed, compared, and classified on the background server according to a deep neural network algorithm. The neural network algorithm can be used to identify image texture and pattern information.

The intelligent head-mounted device in this embodiment of the present invention may be combined with a voice human-computer interaction mode, to be applied to wider fields.

Still using smart glasses as an example, a voice processing unit can be disposed in the smart glasses, audio interactive information can be input and output by a voice input and output device in the smart glasses, and the voice processing unit processes the audio interactive information to realize voice interaction with the operator. The operator does not need to look through a document with hand during an operation process. Therefore, the operator can focus on the work, thereby truly achieving an effect of liberating the hands of the operator.

In an actual application, voice interaction mainly relies on a sound receiving device on the smart glasses. After analysis and verification by a built-in processor, corresponding instructions are sent to the smart glasses through the built-in processor.

The intelligent head-mounted device in this embodiment of the present invention may be combined with at least one of v a smart band, a smart anklet, a smart neck ring, a smart headband, smart clothes, smart gloves, smart shoes, a smart finger ring, smart braces, or a smart armband, to be applied to wider fields.

For example, smart glasses are combined with a smart band. Each operator has a smart band into which identity information of the operator is input. The smart band is used by the smart glasses to identify an identity of the operator. For example, the identity may be identified through intelligent code scanning. The smart glasses identify identities of different operators and assign different work tasks. Applying the smart glasses in work task assignment for the operators can also avoid operation behavior of an operator not qualified to perform the operation. In addition, the smart band further receives task information and makes a sound to remind the operator to wear the glasses when the operator does not wear the glasses.

A micro-computer is built in the smart band, can receive information from the server, and also has a sound output device, to make a sound for reminding. Built-in electronic codes may be provided for the smart glasses to scan the identity.

The intelligent head-mounted device in this embodiment of the present invention may be combined with voice call and video call technologies, to be applied to wider fields.

Smart glasses are used as an example. In the smart glasses, a head-mounted device communications unit establishes a communication connection to an assistance work-related device. The assistance work-related device may be voice call and video call devices. During operation work, the operator can communicate with an assistance work-related person in real time by using the voice call and video call devices, for example, communicate with an expert, and transmit an onsite work video image by using the video call device. The expert or an experienced staff member in the factory can instruct the operator to resolve an onsite problem according to the onsite work video image. In this way, when encountering a problem that has not been encountered before or an especially difficult problem, the operator may contact an expert by using the video communication device to resolve the problem on the spot, without needing to stop the work at hand and convene a solution meeting after summarizing the work problem. The problem can be resolved on the spot with only remote assistance of a head-mounted device communications unit of the smart glasses, greatly saving working time and improving work quality.

The smart glasses record all onsite work video images and processes by using a built-in camera, and transmit them to the server, as valuable data from a first-person perspective, for finding out a main cause and a situation of an accident when the accident occurs, in order that the same accident does not occur next time.

In conclusion, the intelligent head-mounted device of the present invention is mainly aimed at enterprises with complicated operations, a large quantity of operation steps, a long operation procedure, and a high requirement for safety performance, can achieve an effect of work assistance, and unlike others, can combine a new functional technology developed in the intelligent head-mounted device and an existing functional technology with smart glasses and apply the smart glasses to work assistance.

FIG. 4 is a schematic flowchart of a work assistance method based on an intelligent wearable device according to still another preferred implementation of the present invention. As shown in FIG. 4, a work assistance method based on the foregoing intelligent wearable device is provided. The work assistance method includes: S1: the intelligent wearable device displaying a current operation step of a to-be-operated object; S2: determining whether an operation of the operator meets a requirement of the current operation step; and S3: if yes, displaying a next operation step of the to-be-operated object.

The foregoing work assistance method based on an intelligent wearable device in the present invention has a favorable work assistance effect, and work quality is effectively ensured. In addition, work becomes simple, work efficiency is improved, and costs are low.

Further, the work assistance method further includes: S4: if no, obtaining a security level of the operation of the operator; S5: recording the operation of the operator, and sending the operation of the operator to a server that communicates with the intelligent wearable device; and S6: determining, according to the security level, whether the operation can enter the next operation step.

In a specific implementation, in the work assistance method, the step S6 further includes:

S61: if the security level is a severe level, prompting the operator to stop the current operation, and sending operation information of the operator to the server, and the server pushing the operation information to a related terminal, where the related terminal herein is a communications device that can be used for sending a notification to a background administrator related to the operator, and the device may be a terminal device such as a mobile phone, a pad, a PC, a smart band, a smart watch, or smart glasses;

S62: if the security level is an intermediate level, prompting the operator to correct a current operation error;

S63: determining whether the operator has corrected the operation error; and S64: if yes, entering the next operation step; or S65: if no, continuing to prompt the operator to correct the current operation error; and S66: if the security level is a general level, sending warning information to remind the operator, and displaying selection information for choosing whether to enter a next step.

In a variant embodiment, after the step S6, the work assistance method further includes: S7: determining whether the operator is in a non-working state at a predetermined time interval; and S8: if yes, pushing learning content corresponding to the operation error of the operator.

Preferably, before the step S1, the work assistance method further includes: S0: receiving an operation instruction of the operator.

Preferably, after the step S5, the work assistance method further includes: S9: a screening step, setting an average value according to quality and efficiency of the operation step, and screening, as the learning content, an image whose value is greater than the average value from images of a plurality of operation steps; S10: a storage step, storing the learning content into the server; and S11: a data analysis step, analyzing a plurality of pieces of learning content, and selecting optimal learning content as reference information for optimizing the operation step.

Preferably, the work assistance method further includes: S12: a data collection step, collecting operation information of the operator, information about the to-be-operated object, and information about the intelligent wearable device. The operation information includes: an operation time, operation instruction information during the operation, and operation action and posture information.

Preferably, the step S2 further includes: S21: an action identification step, identifying an operation posture of the operator. Before the step S1, the work assistance method further includes: S13: an identity identification step, identifying an identity of the operator.

Preferably, the work assistance method further includes: S14: displaying assistance information according to a received assistance request instruction of the operator, where the assistance information includes video file information, remote assistance information, image information, or 3D model information, and further, the remote assistance information includes: remote voice call information, remote video information, or remote tag information; and S15: for an identified specified part in the to-be-operated object, superimposing an indication layer at a corresponding position of a display unit of the intelligent wearable device, where the indication layer is used to display the assistance information.

In addition, the foregoing work assistance method based on an intelligent wearable device further includes: a working data processing method, specifically including:

S81: identifying an identity of an operator wearing the intelligent wearable device, where the intelligent wearable device assists the operator in working;

S82: collecting working data of the operator; and

S83: analyzing the working data and outputting corresponding evaluation information.

Preferably, after the S2, the work assistance method further includes:

S84: collecting environment information of a working environment of the operator and work-related device information.

Preferably, the working data includes: a time for the operator to complete a preset step, a quantity of times for repeatedly playing the preset step and a time for completing the preset step, work quality of the operator for completing the preset step, a time for the operator to complete the entire operation procedure, all operation postures of the operator for completing the entire operation procedure, a quantity of times for sending alarms of misoperations of the operator, a video of the operator completing the entire operation procedure, and a video of an alarm for the operator. The step S82 further includes:

S821: collecting a time for the operator to complete a preset step, a quantity of times for repeatedly playing the preset step and a time for completing the preset step, and a time for the operator to complete the entire operation procedure; and generating working time data;

S822: collecting a quantity of times for sending alarms of misoperations of the operator, and generating working error data;

S823: collecting a video of the operator completing the entire operation procedure, a video of an alarm for the operator, and all operation postures of the operator for completing the entire operation procedure, and generating working posture data; and S824: determining work quality of the operator for completing the preset step according to the working time data, the working error data, and the working posture data.

Preferably, the S3 further includes:

S831: analyzing the environment information and the work-related device information;

S832: analyzing the working data, where, the working data includes: a time for the operator to complete a preset step, a quantity of times for repeatedly playing the preset step and a time for completing the preset step, work quality of the operator for completing the preset step, a time for the operator to complete the entire operation procedure, all operation postures of the operator for completing the entire operation procedure, a quantity of times for sending alarms of misoperations of the operator, a video of the operator completing the entire operation procedure, and a video of an alarm for the operator; and S833: outputting the evaluation information with reference to the environment information, the work-related device information, and the working data.

Preferably, before the S83, the work assistance method further includes:

S85: detecting various types of work-related vital sign information of the operator, and comprehensively determining whether the operator is suitable for work according to the various types of vital sign information; and if the operator is not suitable for work, storing such information into work recording information of the operator, and prompting the operator in a form of voice or text.

Preferably, the vital sign information includes body temperature, fatigue state, blood pressure, pulse rate, heart rate, and other information, and the evaluation information includes: whether an operation process is standardized, whether an operation order is correct, whether the operator is skilled in the operation, and whether operation steps are complete.

The foregoing data processing method is included in the work assistance method based on an intelligent wearable device provided in the present invention. Therefore, the intelligent wearable device can be used to automatically identity information of the operator, record various types of working information during an operation process, and evaluate information according to the working information, for example, evaluate whether a work operation process is standardized, whether an operation order is correct, whether the operator is skilled in the operation, and whether operation steps are complete. In this way, operation steps and procedures are standardized, a violation operation is avoided, operation step missing or operation disorder of the operator during work is avoided, and operation safety is ensured, thereby greatly reducing hidden dangers caused by human behavior. In addition, work efficiency of the operator is improved while good professional habits of the operator are cultivated. Therefore, a problem of delayed overall working time resulting from incompetence of the operator in some operation steps is resolved, improving overall working capabilities and accomplishment of staff members.

FIG. 5 is a schematic structural diagram of a work assistance system based on an intelligent wearable device according to yet another preferred implementation of the present invention. As shown in FIG. 5, the present invention further provides a work assistance system based on an intelligent wearable device. The work assistance system includes: an operation step display unit 110, disposed in the intelligent wearable device, and configured to display a current operation step of a to-be-operated object; an operation step determining unit 120, configured to determine whether an operation of an operator meets a requirement of the current operation step; and an operation step control unit 130, configured to: when the operation of the operator meets the requirement of the current operation step, control the display unit to display a next operation step of the to-be-operated object.

The foregoing work assistance system based on an intelligent wearable device in the present invention has a favorable work assistance effect, and work quality is effectively ensured. In addition, work becomes simple, work efficiency is improved, and costs are low.

Further, the work assistance system based on an intelligent wearable device further includes: a security level determining unit 140, configured to: when the operation of the operator does not meet the requirement of the current operation step, determine a security level of the operation of the operator that does not meet the requirement; a recording and sending unit 150, configured to record the operation of the operator, and send the operation of the operator to a server that communicates with the intelligent wearable device; and a determining unit 160, configured to determine, according to the security level, whether the operation can enter the next operation step.

Further, the determining unit 160 further includes: a severe level prompting module, configured to: when the security level is a severe level, prompt the operator to stop the current operation, and send operation information of the operator to the server, where the server pushes the operation information to a related terminal; an intermediate level prompting module, configured to: when the security level is an intermediate level, prompt the operator to correct a current operation error; an operation error correction and determining module, configured to determine whether the operator has corrected the operation error, and if yes, enter the next operation step, or if no, continue to prompt the operator to correct the current operation error; and a general level prompting module, configured to: when the security level is a general level, send warning information to remind the operator, and display selection information for choosing whether to enter a next step.

In a preferred embodiment, the work assistance system further includes: a non-working state determining unit, configured to determine whether the operator is in a non-working state at a predetermined time interval; and a learning content push unit, configured to: when the operator is in the non-working state, push learning content corresponding to the operation error of the operator.

In a preferred embodiment, the work assistance system further includes: a screening unit, configured to set an average value according to quality and efficiency of the operation step, and screen, as the learning content, an image whose value is greater than the average value from images of a plurality of operation steps; a storage unit, configured to store the learning content into the server; and a data analysis unit, configured to analyze a plurality of pieces of learning content, and select optimal learning content as reference information for optimizing the operation step.

In a preferred embodiment, the work assistance system further includes: a data collection unit, configured to collect operation information of the operator, information about the to-be-operated object, and information about the intelligent wearable device.

Further, the determining unit includes: an action identification module, configured to identify an operation posture of the operator.

To help the operator to obtain assistance information in a timely manner, the work assistance system further includes: a request assistance unit, configured to display assistance information according to a received assistance request instruction of the operator, where the assistance information includes video file information, remote assistance information, image information, or 3D model information; and an indication layer superimposition display unit, configured to: for an identified specified part in the to-be-operated object, superimpose an indication layer at a corresponding position of the display unit of the intelligent wearable device, where the indication layer is used to display the assistance information.

In addition, the foregoing work assistance system based on an intelligent wearable device further includes: a working data processing apparatus, including:

an assistance device, configured to identify an identity of an operator wearing an intelligent wearable device;

the intelligent wearable device, configured to assist the operator in working; and a server, configured to collect working data of the operator, analyze the working data, and output corresponding evaluation information.

Preferably, the server is further configured to collect environment information of a working environment of the operator and work-related device information. The server includes:

a working time collection unit, configured to collect a time for the operator to complete a preset step, a quantity of times for repeatedly playing the preset step and a time for completing the preset step, and a time for the operator to complete the entire operation procedure; and generate working time data;

a working error collection unit, configured to collect a quantity of times for sending alarms of misoperations of the operator, and generating working error data;

a working posture collection unit, configured to collect a video of the operator completing the entire operation procedure, a video of an alarm for the operator, and all operation postures of the operator for completing the entire operation procedure, and generate working posture data; and a work quality determining unit, configured to work quality of the operator for completing the preset step according to the working time data, the working error data, and the working posture data.

Preferably, the server further includes:

an analysis unit, configured to analyze the environment information, the work-related device information, and the working data; and an evaluation unit, configured to output the evaluation information with reference to the environment information, the work-related device information, and the working data.

FIG. 6 is a schematic structural diagram of a work assistance system based on an intelligent wearable device according to yet another preferred implementation of the present invention. As shown in FIG. 6, the present invention further provides a work assistance system based on an intelligent wearable device. The work assistance system includes: an intelligent wearable device 200 and a server 100. The server 100 exchanges work assistance-related information with the intelligent wearable device 200. The intelligent wearable device 200 includes a processor 210, a memory 220, and a display 230. The processor 210 is connected to the memory 220 and the display 230. The memory 220 stores a set of program code, and the processor 210 is configured to invoke the program code stored in the memory 220, to perform the following operations:

displaying a current operation step of a to-be-operated object on the display 230;

determining whether an operation of an operator meets a requirement of the current operation step; and when the operation of the operator meets the requirement of the current operation step, controlling the display to display a next operation step of the to-be-operated object.

The foregoing work assistance system based on an intelligent wearable device in the foregoing implementation of the present invention has a favorable work assistance effect, and work quality is effectively ensured. In addition, work becomes simple, work efficiency is improved, and costs are low.

Certainly, the memory of the foregoing work assistance system based on an intelligent wearable device in the foregoing implementation of the present invention further stores other program code, and the processor 210 is configured to invoke the program code stored in the memory 220, to perform the following operations:

when the operation of the operator does not meet the requirement of the current operation step, obtaining a security level of the operation of the operator;

recording the operation of the operator, and sending the operation of the operator to a server that communicates with the intelligent wearable device; and determining, according to the security level, whether the operation can enter the next operation step.

Further, the processor 210 is configured to invoke the program code stored in the memory 220, to perform the following operations in the foregoing step of determining, according to the security level, whether the operation can enter the next operation step:

when the security level is a severe level, prompting the operator to stop the current operation, and sending operation information of the operator to the server, where the server pushes the operation information to a related terminal;

when the security level is an intermediate level, prompting the operator to correct a current operation error;

determining whether the operator has corrected the operation error;

if yes, entering the next operation step;

if no, continuing to prompt the operator to correct the current operation error; and when the security level is a general level, sending warning information to remind the operator, and displaying selection information for choosing whether to enter a next step.

Further, the processor 210 is configured to invoke the program code stored in the memory 220, to perform the following operations:

determining whether the operator is in a non-working state at a predetermined time interval; and if yes, pushing learning content corresponding to the operation error of the operator.

Further, the processor 210 is configured to invoke the program code stored in the memory 220, to perform the following operations:

a screening step, setting an average value according to quality and efficiency of the operation step, and screening, as the learning content, an image whose value is greater than the average value from images of a plurality of operation steps;

a storage step, storing the learning content into the server; and a data analysis step, analyzing a plurality of pieces of learning content, and selecting optimal learning content as reference information for optimizing the operation step.

Further, the processor 210 is configured to invoke the program code stored in the memory 220, to perform the following operations:

identifying an operation posture of the operator;

collecting operation information of the operator, information about the to-be-operated object, and information about the intelligent wearable device; and identifying an identity of the operator.

Further, the processor 210 is configured to invoke the program code stored in the memory 220, to perform the following operations:

displaying assistance information according to a received assistance request instruction of the operator; and for an identified specified part in the to-be-operated object, superimposing an indication layer at a corresponding position of a display unit of the intelligent wearable device, where the indication layer is used to display the assistance information.

The foregoing descriptions are merely implementations of the present invention, and are not intended to limit the patent scope of the present invention. Any equivalent structural or procedure change made with reference to the content of the specification and the accompanying drawings of the present invention, or directly or indirect application to other related technical fields shall fall within the patent protection scope of the present invention.

What is claimed is:

1. An intelligent wearable device, wherein the intelligent wearable device is applied to work assistance, and comprises:
    a control unit, configured to control the intelligent wearable device;
    a display unit, configured to display assistance work information;
    a storage unit, configured to store various pieces of data information during a working process;
    a positioning and tracking unit, configured to position and track an operator and an operation object separately, and notify the operator of the positioned and tracked information;
    an identification unit, configured to identify an action of the operator and feature information of the operation object;
    a judging unit, configured to determine whether the action of the operator meets a preset requirement, and whether the feature information of the operation object matches preset feature information; and
    a warning unit, configured to send alarm information when the judging unit fails to generate a determining result.

2. The intelligent wearable device according to claim 1, wherein the intelligent wearable device further comprises:
    a first environment sensor, configured to sense first information of a working environment of the operator;
    a head-mounted device communications unit, configured to establish a communication connection to an assistance work-related device; and
    a second environment sensor, configured to sense second information of the working environment of the operator, wherein
    the display unit is a translucent display, a transparent display, or an opaque display.

3. The intelligent wearable device according to claim 1, wherein the intelligent wearable device and an intelligent motion sensing control device constitute an intelligent wearable system, the intelligent motion sensing control device sends, according to an received action instruction of the operator, a control instruction to control the intelligent wearable device to work, and the intelligent motion sensing control device is at least one of a smart band, a smart anklet, a smart neck ring, a smart headband, smart clothes, smart gloves, smart shoes, a smart finger ring, smart braces, or a smart armband.

4. The intelligent wearable device according to claim 3, wherein the intelligent motion sensing control device comprises:
    a motion sensing action identification unit, configured to identify motion sensing action information of the operator;
    a processing unit, configured to receive the motion sensing action information, and generate corresponding control information;
    a motion sensing communications unit, configured to send the control information to the intelligent head-mounted device, and receive interaction information of the intelligent head-mounted device;
    a motion sensing sensor, configured to detect various types of work-related vital sign information of the operator;
    a health judging unit, configured to comprehensively determine whether the operator is suitable for work according to the various types of vital sign information;
    an alarm unit, configured to send alarm information when the operator is not suitable for work; and
    an operation object information obtaining apparatus, configured to obtain work-related information of the operation object.

5. A work assistance method based on an intelligent wearable device having a control unit configured to control the intelligent wearable device, a display unit configured to display the intelligent wearable device, a storage unit configured to store various pieces of data information during a working process and a positioning and tracking unit configured to position and track an operator and an operation object separately, and notify the operator of the positioned and tracked information, wherein the work assistance method comprises:
    S1: the intelligent wearable device displaying a current operation step of a to-be-operated object;
    S2: determining whether an operation of the operator meets a requirement of the current operation step; and
    S3: if determining the operation of the operator meets the requirement of the current operation step, displaying a next operation step of the to-be-operated object;
    S4: if determining the operation of the operator fails to meet the requirement of the current operation step, obtaining a security level of the operation of the operator;
    S5: recording the operation of the operator, and sending the operation of the operator to a server that communicates with the intelligent wearable device; and
    S6: determining, according to the security level, whether the operation can enter the next operation step.

6. The work assistance method according to claim 5, wherein in the work assistance method, the step S6 further comprises:
    S61: if the security level is a severe level, prompting the operator to stop the current operation, and sending operation information of the operator to the server, and the server pushing the operation information to a related terminal;
    S62: if the security level is an intermediate level, prompting the operator to correct a current operation error;
    S63: determining whether the operator has corrected the operation error; and
    S64: if determining the operator has corrected the operation error, entering the next operation step; or
    S65: if determining the operator has not corrected the operation error, continuing to prompt the operator to correct the current operation error; and
    S66: if the security level is a general level, sending warning information to remind the operator, and displaying selection information for choosing whether to enter a next step.

7. The work assistance method according to claim 5, wherein after the step S6, the work assistance method further comprises:
    S7: determining whether the operator is in a non-working state at a predetermined time interval; and S8: if determining the operator being in the non-working state at the predetermined time interval, pushing learning content corresponding to the operation error of the operator.

8. The work assistance method according to claim 7, wherein between the step S5 and the step S6, the work assistance method further comprises:
S9: a screening step, setting an average value according to quality and efficiency of the operation step, and screening, as the learning content, an image whose value is greater than the average value from images of a plurality of operation steps;
S10: a storage step, storing the learning content into the server; and
S11: a data analysis step, analyzing a plurality of pieces of learning content, and selecting optimal learning content as reference information for optimizing the operation step.

9. The work assistance method according to claim 5, wherein the work assistance method further comprises:
the step S2 further comprising:
S21: an action identification step, identifying an operation posture of the operator; and
before the step S1, the work assistance method further comprises:
S12: a data collection step, collecting operation information of the operator, information about the to-be-operated object, and information about the intelligent wearable device; and
S13: an identity identification step, identifying an identity of the operator.

10. The work assistance method according to claim 6, wherein the work assistance method further comprises:
S14: displaying assistance information according to a received assistance request instruction of the operator; and
S15: for an identified specified part in the to-be-operated object, superimposing an indication layer at a corresponding position of the display unit of the intelligent wearable device, wherein the indication layer is used to display the assistance information.

11. A work assistance system based on an intelligent wearable device having a control unit configured to control the intelligent wearable device, a display unit configured to display the intelligent wearable device, a storage unit configured to store various pieces of data information during a working process and a positioning and tracking unit configured to position and track an operator and an operation object separately, and notify the operator of the positioned and tracked information, wherein the work assistance system comprises:
an operation step display unit, configured to display a current operation step of a to-be-operated object;
an operation step judging unit, configured to determine whether an operation of the operator meets a requirement of the current operation step;
an operation step control unit, configured to: when the operation of the operator meets the requirement of the current operation step, control the operation step display unit to display a next operation step of the to-be-operated object;
a security level judging unit, configured to: when the operation of the operator does not meet the requirement of the current operation step, determine a security level of the operation of the operator that does not meet the requirement;
a recording and sending unit, configured to record the operation of the operator, and send the operation of the operator to a server that communicates with the intelligent wearable device; and
a determining unit, configured to determine, according to the security level, whether the operation can enter the next operation step.

12. The work assistance system based on the intelligent wearable device according to claim 11, wherein the determining unit further comprises:
a severe level prompting module, configured to: when the security level is a severe level, prompt the operator to stop the current operation, and send operation information of the operator to the server, wherein the server pushes the operation information to a related terminal;
an intermediate level prompting module, configured to: when the security level is an intermediate level, prompt the operator to correct a current operation error;
an operation error correction and determining module, configured to determine whether the operator has corrected the operation error, and if determining the operator has corrected the operation error, enter the next operation step, or if determining the operator has not corrected the operation error, continue to prompt the operator to correct the current operation error; and
a general level prompting module, configured to: when the security level is a general level, send warning information to remind the operator, and display selection information for choosing whether to enter a next step.

13. The work assistance system based on the intelligent wearable device according to claim 11, wherein the work assistance system further comprises:
a non-working state judging unit, configured to determine whether the operator is in a non-working state at a predetermined time interval; and
a learning content push unit, configured to: when the operator is in the non-working state, push learning content corresponding to the operation error of the operator.

14. The work assistance system based on the intelligent wearable device according to claim 13, wherein the work assistance system further comprises:
a screening unit, configured to set an average value according to quality and efficiency of the operation step, and screen, as the learning content, an image whose value is greater than the average value from images of a plurality of operation steps;
the storage unit, configured to store the learning content into the server; and
a data analysis unit, configured to analyze a plurality of pieces of learning content, and select optimal learning content as reference information for optimizing the operation step.

15. The work assistance system based on the intelligent wearable device according to claim 11, wherein the work assistance system further comprises:
a data collection unit, configured to collect operation information of the operator, information about the to-be-operated object, and information about the intelligent wearable device; and
an identity identification unit, configured to identify the identity of the operator, wherein the operation step judging unit comprises: an action identification module, configured to identify an operation posture of the operator.

16. The work assistance system based on the intelligent wearable device according to claim 12, wherein the work assistance system further comprises:
- a request assistance unit, configured to display assistance information according to a received assistance request instruction of the operator; and
- an indication layer superimposition display unit, configured to: for an identified specified part in the to-be-operated object, superimpose an indication layer at a corresponding position of the display unit of the intelligent wearable device, wherein the indication layer is used to display the assistance information.

* * * * *